United States Patent
Gassmann

[11] Patent Number: 6,116,392
[45] Date of Patent: Sep. 12, 2000

[54] COUPLING DEVICE FOR TRANSMITTING TORQUE

[75] Inventor: Theodor Gassmann, Siegburg, Germany

[73] Assignee: GKN Viscodrive GmbH, Lohmar, Germany

[21] Appl. No.: 09/267,242

[22] Filed: Mar. 12, 1999

[30] Foreign Application Priority Data

Mar. 13, 1998 [DE] Germany ............................ 198 10 940

[51] Int. Cl.$^7$ .................. F16D 25/02; F16D 25/0638
[52] U.S. Cl. ................ 192/35; 192/57; 192/85 AA; 192/103 F
[58] Field of Search ............... 192/35, 57, 58.41, 192/58.42, 70.25, 85 AA, 103 F, 111 A

[56] References Cited

U.S. PATENT DOCUMENTS

| | | | |
|---|---|---|---|
| 3,612,237 | 10/1971 | Honda | 192/85 AA |
| 4,664,242 | 5/1987 | Downs | 192/85 AA |
| 4,848,506 | 7/1989 | Shimada et al. | 192/57 X |
| 4,924,991 | 5/1990 | Takeuchi | 192/111 A |
| 5,070,975 | 12/1991 | Tanaka et al. | 192/35 |
| 5,556,343 | 9/1996 | Gassmann et al. | 192/85 AA |
| 5,884,739 | 3/1999 | Constantin | 192/35 |

Primary Examiner—Rodney H. Bonck
Attorney, Agent, or Firm—Francis N. Carten

[57] ABSTRACT

A coupling device for transmitting torque between a first part and a second part which are rotatable relative to one another is disclosed. The coupling device comprises a multi-plate coupling unit with axially alternating arranged first plates and second plates. The first plates are each connected in a rotationally fixed manner to one of the first part or the second part and the second plates are each connected in a rotationally fixed manner to the other of the first part or the second part. The coupling device further comprises an actuating assembly for axially loading the multi-plate coupling unit by means of a setting piston. The multi-plate coupling unit also comprises a first annular chamber filled with a highly viscous fluid and delimited by the setting piston, and a rotational member arranged in the annular chamber. The first annular chamber is formed in one of the first or second parts with the rotational member being connected in a rotationally fixed manner to the other of the first or second part. A relative rotation between the first and second parts causes pressure-loading and displacement of the setting piston towards the multi-plate coupling unit as a result of the shear of the highly viscous fluid in the first annular chamber. A pressure plate is positioned between the setting piston and the multi-plate coupling. The faces of the pressure plate and the setting piston together form a radially outwardly tapering gap in which there are arranged radially freely movable wedge elements in a play-free manner.

6 Claims, 3 Drawing Sheets

COUPLING DEVICE FOR TRANSMITTING TORQUE

BACKGROUND OF THE INVENTION

The present invention relates to a coupling device for transmitting torque between a first part and a second part, which are rotatable relative to one another. In general, such a coupling device comprises a multi-plate coupling unit having axially and alternatingly arranged first plates and second plates. The first plates are each connected in a rotationally fixed manner to either the first part or the second part. The second plates are each connected in a rotationally fixed manner to the other of the first part or the second part. The coupling device further comprises an actuating assembly for axially loading the multi-plate coupling unit by means of a setting piston arranged opposite the multi-plate coupling unit. The actuating assembly includes a first annular chamber filled with a highly viscous fluid and delimited by the setting piston. A rotational member is arranged in the first annular chamber. The first annular chamber of the actuating assembly is formed in either the first part or the second part. The rotational member is connected in a rotationally fixed manner to the other of the first part and the second part. Relative rotation between the first part and the second part causes pressure-loading and displacement of the setting piston towards the multi-plate coupling unit to close the unit as a result of the shear of the highly viscous fluid in the annular chamber and thereby transmitting torque between the first part and the second part.

Coupling devices of the type described above are offered by the Applicant under the name of Visco-Lok coupling and were described for the first time in German Patent Application P 43 27 519.2 and German Patent Application P 43 43 307.3. To balance the volume within the first annular chamber under conditions where the setting piston is pressure-loaded, a reservoir is provided in the first or second part, whichever part contains the first annular chamber. The reservoir is formed by a second annular chamber and a pre-tensioned annular piston. Within the first annular chamber the rotational member covers an annular groove whose circumferential length is delimited and whose first end is connected to the reservoir and whose second end is connected to the portion of the first annular chamber which directly adjoins the setting piston. There can be provided means upon when the relative directions of rotation of the first part and the second part are reversed it also causes a reversal of the connections of the ends of the annular groove with the reservoir and, respectively, with the portion of the first annular chamber which directly adjoins the setting piston.

The actuating assembly of the Visco-Lok coupling of the above-described type is provided with an enormously high pressure capacity, but it has a limited conveying volume. A first disadvantage of this coupling device is that the reaction speed is restricted because prior to closing the multi-plate coupling unit the play in the coupling unit has to be overcome at the relatively slow setting speed of the setting piston. A second disadvantage is that the play increases due to wear of the coupling device, which has a pronounced effect on the reaction time of the multi-plate coupling unit.

In view of an ABS compatibility of a vehicle with a hang-on configuration, whose driveline is provided with a Visco-Lok coupling, the delayed reaction behavior is often desirable. However, in other cases, a short reaction time is necessary. Regardless of the desired reaction time, it is disadvantageous if the reaction time is substantially influenced by the wear condition of the plates in the coupling unit and by the installation tolerances.

It is therefore the object of the present invention to provide a means that ensures a uniform and constant reaction of the coupling device of the described type, independently of the wear condition of the plates and the installation tolerances.

SUMMARY OF THE INVENTION

According to a first embodiment, a pressure plate is positioned between the setting piston and the multi-plate coupling unit. The pressure plate and the setting piston have opposing faces. One or both of the opposing faces of the pressure plate and the setting piston are provided with a wedge-like or conical face, which together with the other face, forms a radially outwardly tapering gap in which there are arranged radially freely movable wedge elements in a play-free way. As the inventive coupling device rotates, even if the first and second parts are stationary, the wedge elements, under normal operating conditions, are pressed into the outwardly tapering gap under the influence of the centrifugal force. In this way, any production-related or wear-related axial play within the multi-plate coupling unit and between the multi-plate coupling unit and the actuating assembly is compensated for. Thus, when the relative rotation begins between the first and second parts, in spite of the low conveying rate and without delay, there occurs effective loading of the multi-plate coupling unit and a locking effect of the coupling device.

As the plate wear increases, the wedge elements re-adjust themselves automatically under the influence of the centrifugal force, so that the reaction behavior of the coupling device remains unchanged for the duration of the service life of the coupling device and remains constant without being influenced by the wear condition.

In an advantageous embodiment, spring elements can be provided radially inside the wedge elements, which spring elements hold the wedge elements radially outwardly under pretension, thus preventing the wedge elements from rattling or from falling backwards in the stationary condition.

In an advantageous embodiment, the wedge angle at the wedge elements is in any case so small that self-inhibition occurs at the wedge elements. Thus, any axial pressure applied by the setting piston can never cause the wedge elements to be pushed radially backwards, but necessarily acts directly and axially on the multi-plate coupling unit.

The wedge-like or conical faces at the pressure plate and/or at the setting piston can preferably constitute the basal areas of radial grooves whose parallel walls are laterally delimited, so that the wedge elements are guided laterally, i.e. directly in the radial direction.

In an alternative embodiment, to eliminate the need to produce such radial grooves mechanically, it is possible, for cost saving purposes, to provide entirely conical faces at the pressure plate and/or at the setting piston and for a disc-shaped cage element with radial slots to be provided between the setting piston and the pressure plate, in which disc-shaped cage elements the wedge elements are held so as to be accurately guided laterally, i.e. in the radial direction. Producing such a cage element in the form of a simple stamped sheet metal part is considerably cheaper than producing a plurality of radial grooves in accordance with the previously mentioned embodiment.

In a preferred embodiment, at least three, but preferably no more than four, wedge elements are uniformly circumferentially distributed.

A second embodiment is characterized in that, into the setting piston there is inserted at least one re-setting piston which is axially movable relative to said setting piston and which seals a cylinder chamber hydraulically connected to the first annular chamber. The re-setting piston abuts against the pressure plate positioned between the setting piston and the multi-plate coupling unit. If a positive fluid pressure prevails in the first annular chamber, said re-setting piston also overcomes production- and wear-related play in the multi-plate coupling unit or between the multi-plate coupling unit and the actuating assembly.

Even when a coupling device of said type is in the stationary condition, the positive pressure in the first annular chamber usually occurs due to the fact that a reservoir connected to the first annular chamber is under pretension. The connection between the first annular chamber and the cylinder chamber of the re-setting piston is preferably established by axial bores with a small cross-section. These axial bores can influence the reaction behavior of the coupling device.

As the setting piston is an annular piston, the respective re-setting piston, of which there is provided at least one, can also preferably be designed as an annular piston which engages an annular cylinder chamber in the setting piston. Moreover, it is also possible to provide at least three circumferentially distributed re-setting pistons which can easily be sealed individually and which require a much smaller volume for axial re-setting purposes.

In the second embodiment, as described above, any play can be compensated for by the invention and the coupling device in accordance with the second embodiment can also achieve a delayed reaction behavior. By selecting suitable hydraulic connection paths between the first annular chamber and the cylinder chamber of the resetting piston when the setting piston is pressure-loaded it is possible to achieve simultaneous yielding of the re-setting piston. The design of the connecting bores thus determines the dynamic behavior of the system. When the speed of the setting piston is low, the fluid is displaced from the cylinder chamber during actuation, the re-setting piston yields and the locking effect is built up with delay. When the speed of the setting piston is high, a higher pressure is also generated in the cylinder chamber, which intensifies the initial locking effect. The dimensions of the connecting bores relative to the viscosity of the highly viscous fluid also determine the dynamic behavior of the system.

Because the viscosity of the fluid changes as a function of the temperature, the dynamic behavior necessarily also depends on the temperature. The gap between the setting piston and the pressure plate, which gap, in turn, depends on installation tolerances and plate wear, defines the length of the delaying phase during a slow pressure build-up.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
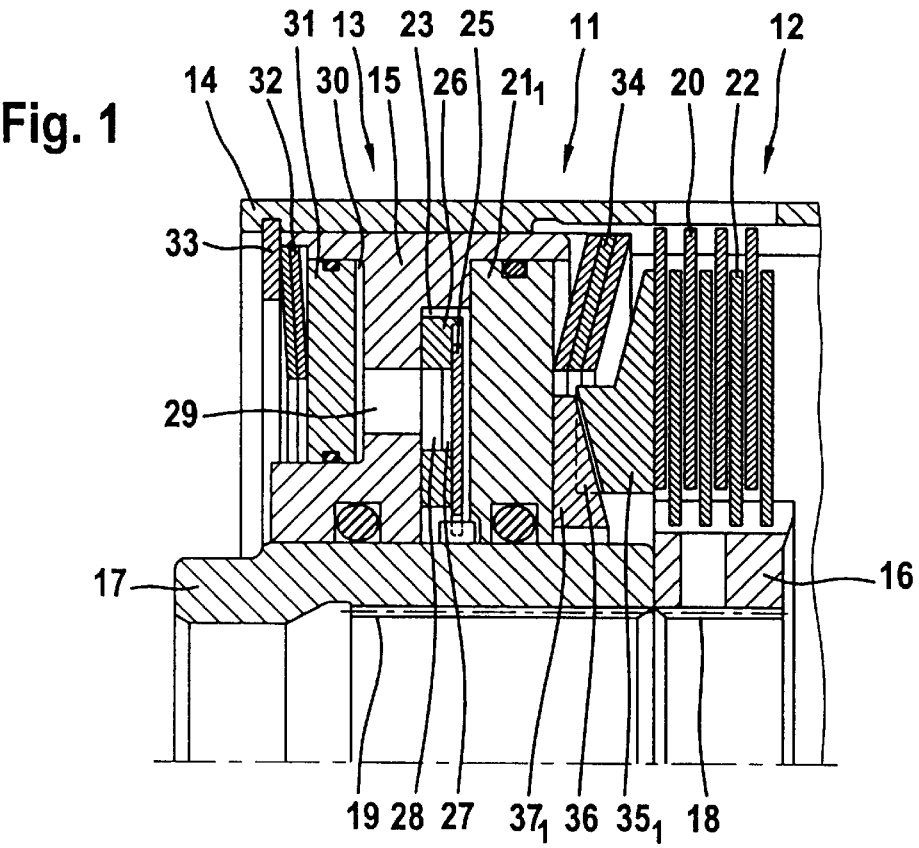
FIG. 1 shows half a section through a first embodiment of a coupling device having wedges guided in wedge-shaped grooves.

The parts corresponding to one another in FIGS. 1, 2 and 4 will be described jointly below. A coupling device 11 in accordance with one embodiment of the invention comprises a multi-plate coupling unit 12 and an actuating assembly 13.

A housing 15 of the actuating assembly 13 is inserted into a coupling housing 14. The two housings 14 and 15 are connected to one another in a rotationally fixed manner and form a portion of a first part.

A coupling hub 16 and a hub 17 of the actuating assembly 13 are each provided with corresponding inner teeth 18, 19 and can be connected to one another in a rotationally fixed manner by an inserted splined shaft (now shown). The coupling hub 16 and hub 17 form a second part. The first part and the second part are rotatable relative-to each other.

A plurality of first plates 20 are held in the coupling housing 14 so as to be rotationally fixed and axially movable relative to one another. On hub 16, there are provided a plurality of second plates 22 which are held so as to be rotationally fixed and axially movable relative to one another and the second plates 22 are arranged to alternate with the first plates 20. The housing 15 contains a setting piston 21 which forms a first annular chamber 23 together with the housing 15. The parts rotating with the annular chamber 23 rotate together with the housing 14.

The first annular chamber 23 contains a plate-like rotational member 25 which, by means of inner teeth, is connected in a rotationally fixed manner to the hub 17 and thus to the coupling hub 16. Furthermore, the first annular chamber 23 contains a grooved member 26 that forms a circumferentially delimited annular groove 27 that is sealed by the rotational member 25.

Via bores 28 and channels 29, the annular groove 27 is connected to a reservoir 30. The reservoir 30 is sealed by a displaceable annular piston 31 that is loaded by plate springs 32, which are supported by a securing ring 33 in the coupling housing 14. The load of the setting piston 21 on the multi-plate coupling unit 12 is relieved by plate springs 34, which are supported on the coupling housing 14, and which bias the setting piston 21 away from coupling unit 12. In the state of the art as noted it has been described in detail that when there exists a relative speed between the first part and the second part as a result of the relative rotation between the rotational member 25 and the annular groove 27 formed in the grooved member 26, the actuating assembly 13 increases the fluid pressure of same in that part of the first annular chamber 23 which is directly delimited by the setting piston 21.

In FIG. 1, the end face of the setting piston $21_1$ facing the multi-plate coupling unit 12 is completely planar and radial. Between the setting piston 21 and the multi-plate coupling unit 12 there is arranged a pressure plate $35_1$ having a face opposing the end face of the setting piston $21_1$ and in which there is provided a plurality of circumferentially distributed wedge-shaped grooves 36 whose base, together with the end face of the setting piston $21_1$, forms a radially, outwardly tapering gap.

Each wedge-shaped groove 36 is engaged by a wedge element $37_1$ which moves outwardly under the influence of the centrifugal force as the first part and second part are rotated and presses the pressure plate $35_1$ against the coupling unit 12 in such a way that the plates 20 and 22 adjust themselves relative to one another in a play-free way, with the wedge elements $37_1$ jamming in the process, so that they cannot fall back even if the centrifugal force decreases. Preferably, the wedge angle of the gap is sufficiently small that self-inhibition occurs at the wedge elements $37_1$.

Figure 2:
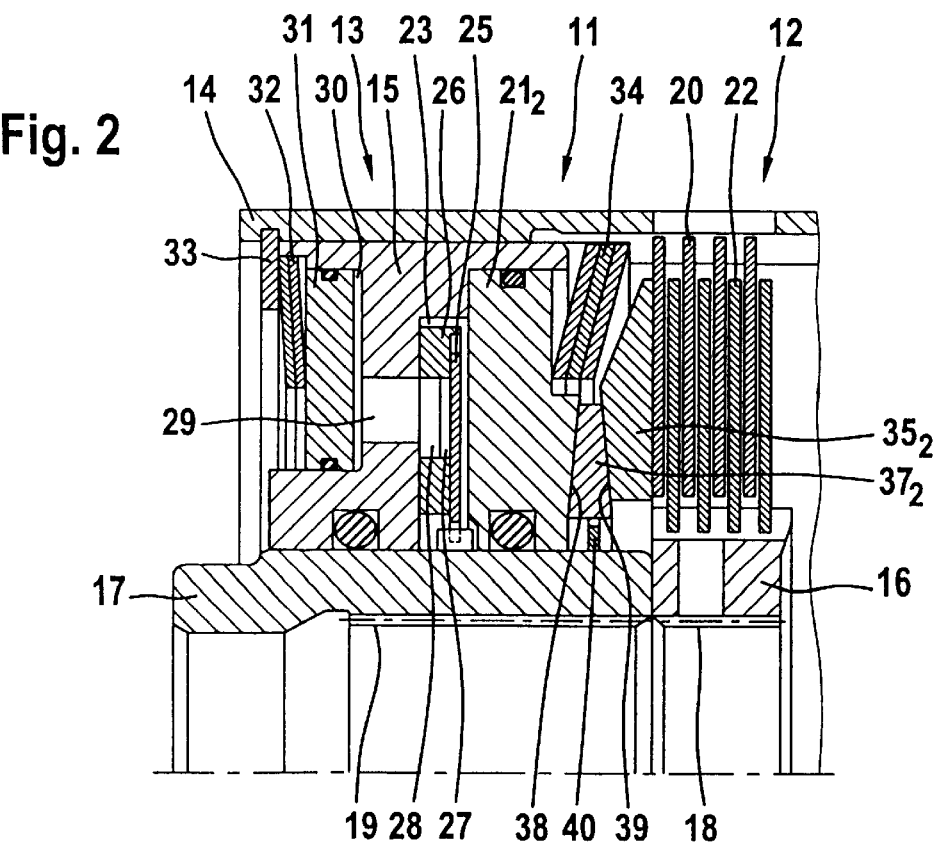
FIG. 2 shows half a section through an alternative coupling device with the wedge elements being held in a cage element.

In FIG. 2, the setting piston $21_2$ at its end face facing towards the multi-plate coupling unit 12, is provided with a conical face 38. An opposing conical face 39, which is symmetric relative to conical face 38, is provided on a pressure plate $35_2$ positioned between the setting piston $21_2$ and the coupling unit 12. Between the conical faces 38 and 39, there is provided a plurality of wedge elements $37_2$ which are guided in a plate-shaped cage element 40. The conical faces 38, 39 are complete rotational faces.

Figure 3:
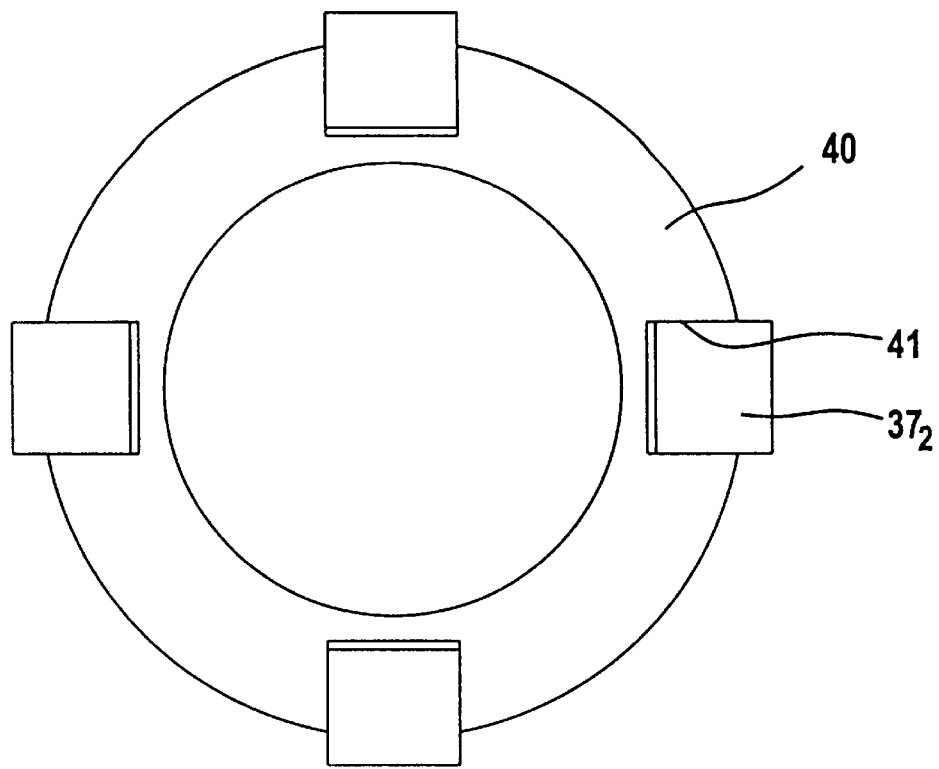
FIG. 3 is an axial view of the wedge elements and of the cage element according to FIG. 2.

In FIG. 3, the cage element 40 is shown with four punched-out slots 41 which form the radial guiding means for the wedge elements $37_2$. Preferably, cage element 40 is formed from a sheet metal ring.

Figure 4:
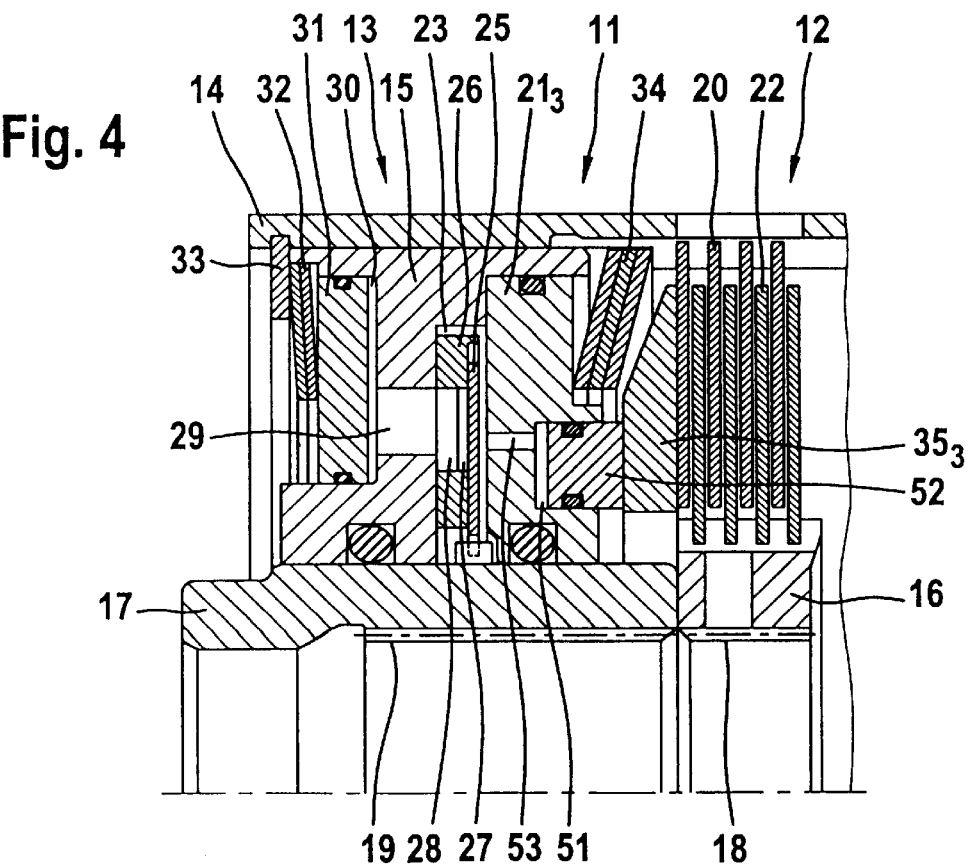
FIG. 4 shows half a section through an alternative coupling device having a re-setting piston.

In FIG. 4, the setting piston $21_3$ is provided with a cylindrical chamber 51 on the side facing the coupling unit 12. An annular re-setting piston 52 in the form of a compensating piston is positioned in the cylindrical chamber 51. Cylindrical chamber 51 is connected to the first annular chamber 23 by a bore 53. By means of a radial end face, the annular re-setting piston 52 abuts against an equally radial end face of a pressure plate $35_3$ arranged between the setting piston 21 and the multi-plate coupling unit 12.

Figure 5:
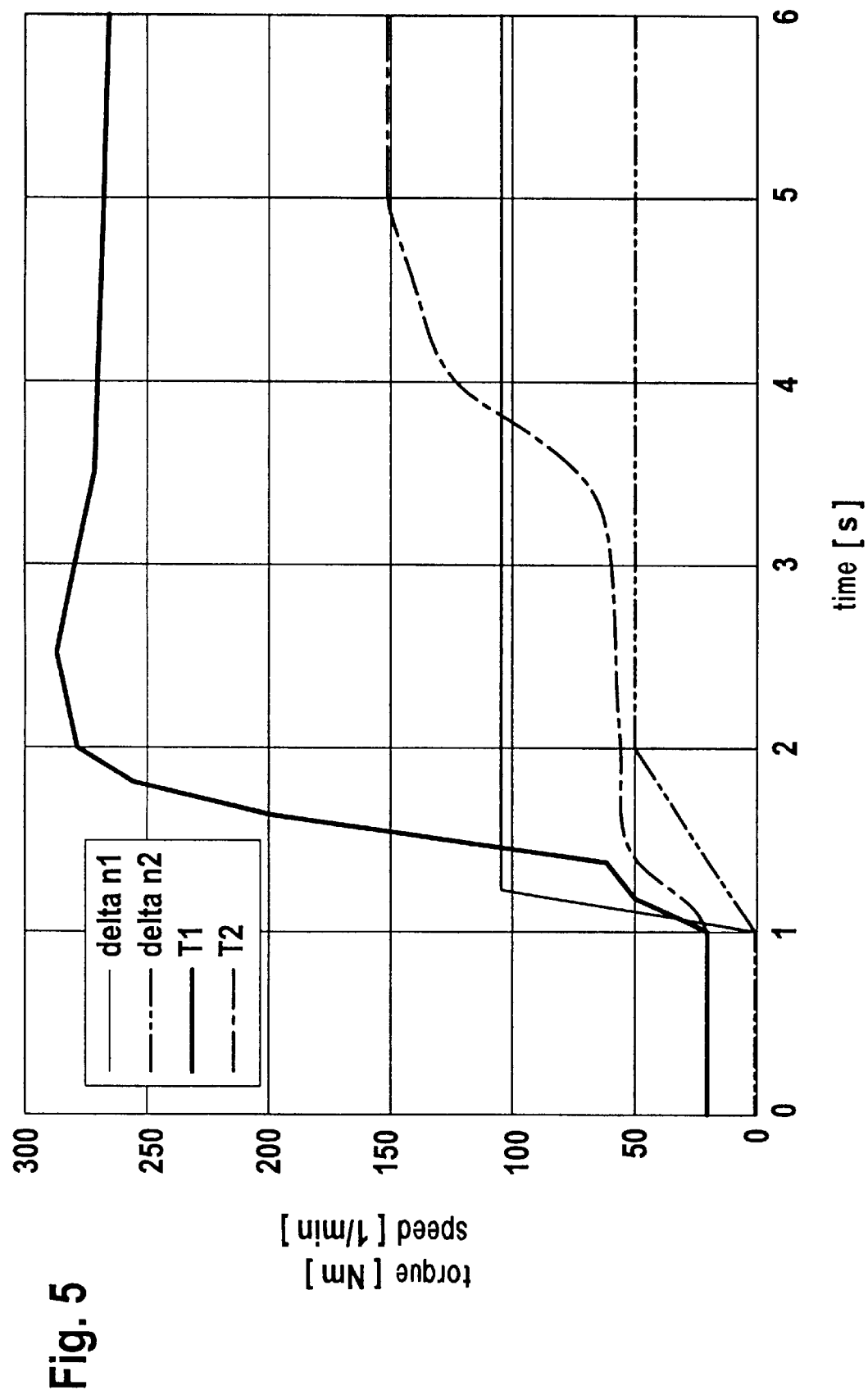
FIG. 5 shows the characteristic torque curves of a coupling device designed according to FIG. 4.

FIG. 5 shows the reaction behavior of a coupling device 11 designed according to FIG. 4 for two differential speeds (delta n1, delta n2) and the respective output torque values (T1, T2). In the case of a high and rapidly built-up differential speed, delta n1, a high torque T1 is built up rapidly, which then decreases slightly. In the case of a low and more slowly increasing differential speed, delta n2, there occurs a delayed build-up of the torque T2, which has a correspondingly lower maximum value.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. A coupling device for transmitting torque between a first part and a second part, said first part rotatable relative to said second part, said coupling device comprising:

a multi-plate coupling unit having a plurality of axially and alternatingly arranged first plates and second plates, said first plates each connected in a rotationally fixed manner to one of said first part and said second part and said second plates each connected in a rotationally fixed manner to the other of said first part and said second part;

said coupling device further including an actuating assembly for axially loading said multi-plate coupling unit by means of a setting piston;

said actuating assembly having an annular chamber filled with a highly viscous fluid and delimited by said setting piston;

a rotational member arranged in said annular chamber, said annular chamber of said actuating assembly being formed in one of said first part and said second part with said rotational member connected in a rotationally fixed manner to the other of said first part and said second part;

a relative rotation between said first part and said second part effecting pressure-loading and displacement of said setting piston towards said multi-plate coupling unit as a result of the shear of said highly viscous fluid in said annular chamber; and a pressure plate positioned between said setting piston and said multi-plate coupling unit, said pressure plate and said setting piston having opposed faces, at least one of said faces being tapered thus forming a radially outwardly tapering gap between said opposed faces in which there are arranged radially freely movable wedge elements in a play-free manner wherein said faces of said pressure plate and said setting piston form the basal areas of a plurality of radial grooves, said wedge elements being arranged in said radial grooves.

2. A device according to claim 1 wherein, between said setting piston and said pressure plate there is positioned a disc-shaped cage element having slots which are open and in which said wedge elements are held and guided.

3. A device according to claim 1 wherein said gap has an angle that is small enough for self-inhibition to occur at said wedge elements.

4. A coupling device for transmitting torque between a first part and a second part, said first part rotatable relative to said second part, said coupling device comprising:

a multi-plate coupling unit having a plurality of axially and alternatingly arranged first plates and second plates, said first plates each connected in a rotationally fixed manner to one of said first part and said second part and said second plates each connected in a rotationally fixed manner to the other of said first part and said second part;

said device further comprising an actuating assembly for axially loading said multi-plate coupling unit by means of a setting piston;

said actuating assembly comprising an annular chamber filled with a highly viscous fluid and delimited by said setting piston, and a rotational member arranged in said annular chamber, said annular chamber being connected to a reservoir, said reservoir being sealed by a displaceable annular piston loaded by spring plates;

said annular chamber of said actuating assembly being formed in one of said first part and said second part and said rotational member being connected in a rotationally fixed manner to the other of said first part and said second part;

a relative rotation between said first part and said second part causing pressure-loading and displacement of said setting piston towards said multi-plate coupling unit as a result of the shear of said highly viscous fluid in said annular chamber; and said setting piston receiving at least one re-setting piston which is axially movable relative to said setting piston, said re-setting piston sealing a cylinder chamber hydraulically connected to said annular chamber by an open bore and said re-setting pistol abutting against a pressure plate in said multi-plate coupling unit, said pressure plate positioned between said multi-plate coupling unit and said setting piston.

5. A device according to claim 4 wherein said annular chamber is a first annular chamber and said re-setting piston is an annular piston and said cylinder chamber comprises a second annular chamber.

6. A device according to claim 4 wherein at least three cylindrical re-setting pistons are inserted into said setting piston and circumferentially distributed in said setting piston.

* * * * *